(12) United States Patent
Wang et al.

(10) Patent No.: US 11,934,290 B2
(45) Date of Patent: *Mar. 19, 2024

(54) INTERACTIVE MODEL PERFORMANCE MONITORING

(71) Applicant: EQUIFAX INC., Atlanta, GA (US)

(72) Inventors: Zhenyu Wang, Atlanta, GA (US); Vickey Chang, Atlanta, GA (US); Jeffrey Feng, Atlanta, GA (US)

(73) Assignee: Equifax Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,360

(22) Filed: Nov. 7, 2022

(65) Prior Publication Data
US 2023/0148083 A1 May 11, 2023

Related U.S. Application Data

(63) Continuation of application No. 16/638,037, filed as application No. PCT/US2017/046872 on Aug. 15, 2017, now Pat. No. 11,507,489.

(51) Int. Cl.
*G06F 11/00* (2006.01)
*G06F 11/34* (2006.01)
(Continued)

(52) U.S. Cl.
CPC ...... *G06F 11/3447* (2013.01); *G06F 11/3452* (2013.01); *G06F 16/9038* (2019.01);
(Continued)

(58) Field of Classification Search
None
See application file for complete search history.

(56) References Cited

U.S. PATENT DOCUMENTS 5,953,707 A * 9/1999 Huang ............ G06Q 10/06315
705/7.31
7,831,464 B1 * 11/2010 Nichols ............... G06F 11/3476
705/7.39
(Continued)

FOREIGN PATENT DOCUMENTS

WO 2005020031 A2 3/2005

OTHER PUBLICATIONS

Javed, Waqas, Bryan McDonnel, and Niklas Elmqvist. "Graphical perception of multiple time series." IEEE transactions on visualization and computer graphics 16.6 (2010): 927-934. (Year: 2010).*
(Continued)

Primary Examiner — Gurkanwaljit Singh
(74) Attorney, Agent, or Firm — Kilpatrick Townsend & Stockton LLP

(57) ABSTRACT

Certain aspects involve providing automated performance monitoring of statistical models. For example, a processing device is used for performing a statistical analysis on information in an archive to extract historical data, scores, and attributes. The processing device calculates performance metrics based at least in part on the historical data, scores, and attributes. The processing device pre-calculates summary performance data based at least in part on the performance metrics. The summary performance data is stored in files with predefined layouts, which are stored in a non-transitory, computer-readable medium. Segmented data is presented from a file to a user through a graphical user interface (GUI). In some aspects, various reports of the segmented data are presented interactively by detecting a selection by the user of a segmentation and displaying the corresponding segmented data.

20 Claims, 16 Drawing Sheets

(51) Int. Cl.
*G06F 16/9038* (2019.01)
*G06F 16/904* (2019.01)
*G06F 17/18* (2006.01)
*G06F 40/186* (2020.01)
*G06Q 10/0639* (2023.01)

(52) U.S. Cl.
CPC ............ *G06F 16/904* (2019.01); *G06F 17/18* (2013.01); *G06F 40/186* (2020.01); *G06Q 10/06393* (2013.01)

(56) References Cited

U.S. PATENT DOCUMENTS

| | | | | |
|---|---|---|---|---|
| 8,204,809 | B1 * | 6/2012 | Wise | G06Q 40/06 705/36 R |
| 8,214,238 | B1 * | 7/2012 | Fairfield | G06Q 30/0203 705/7.29 |
| 8,498,915 | B2 * | 7/2013 | Eder | G06Q 40/06 705/37 |
| 8,577,775 | B1 * | 11/2013 | Gerber | G06Q 40/06 705/36 R |
| 8,781,882 | B1 * | 7/2014 | Arboletti | G06Q 10/0639 705/7.41 |
| 9,058,627 | B1 | 6/2015 | Wasser et al. | |
| 9,171,104 | B2 * | 10/2015 | Gotz | G06F 16/904 |
| 9,245,057 | B1 * | 1/2016 | Fletcher | G06F 16/24542 |
| 9,870,434 | B1 * | 1/2018 | Ratsaby | G06F 11/323 |
| 11,250,068 | B2 * | 2/2022 | Bingham | G06F 16/90335 |
| 2002/0022988 | A1 * | 2/2002 | Columbus | G06Q 40/02 705/36 R |
| 2002/0077711 | A1 | 6/2002 | Nixon et al. | |
| 2005/0216421 | A1 * | 9/2005 | Barry | H04L 43/06 705/64 |
| 2007/0226024 | A1 * | 9/2007 | Harvey | G06Q 10/06393 705/7.11 |
| 2008/0027841 | A1 * | 1/2008 | Eder | G06Q 40/00 705/35 |
| 2008/0243666 | A1 * | 10/2008 | Rowan | G06Q 40/04 705/37 |
| 2009/0006226 | A1 * | 1/2009 | Crowder | G06Q 40/12 705/30 |
| 2009/0018891 | A1 * | 1/2009 | Eder | G06Q 10/0635 705/7.29 |
| 2009/0240574 | A1 * | 9/2009 | Carpenter | G06Q 40/06 705/36 R |
| 2009/0265283 | A1 * | 10/2009 | Carpenter | G06Q 40/06 705/36 R |
| 2010/0005034 | A1 * | 1/2010 | Carpenter | G06Q 40/06 705/36 R |
| 2011/0047058 | A1 | 2/2011 | Erbey et al. | |
| 2012/0173406 | A1 | 7/2012 | Fei et al. | |
| 2012/0278226 | A1 | 11/2012 | Kolo et al. | |
| 2013/0073518 | A1 | 3/2013 | Srivastava et al. | |
| 2014/0067713 | A1 * | 3/2014 | Gerber | G06Q 40/04 705/36 R |
| 2014/0379436 | A1 * | 12/2014 | White | G06Q 10/0639 705/7.38 |
| 2015/0235143 | A1 * | 8/2015 | Eder | G16Z 99/00 706/12 |
| 2015/0278335 | A1 | 10/2015 | Opitz et al. | |
| 2016/0105338 | A1 * | 4/2016 | Fletcher | G06F 3/0481 709/224 |
| 2016/0196587 | A1 * | 7/2016 | Eder | G06Q 30/0271 705/14.49 |
| 2017/0084062 | A1 * | 3/2017 | Guo | G06F 11/3476 |
| 2018/0276710 | A1 * | 9/2018 | Tietzen | G06Q 30/0269 |

OTHER PUBLICATIONS

Yigitbasioglu, Ogan M., and Oana Velcu. "A review of dashboards in performance management: Implications for design and research." International Journal of Accounting Information Systems 13.1 (2012): 41-59. (Year: 2012).*
Ko, Ryan KL, Stephen SG Lee, and Eng Wah Lee. "Business process management (BPM) standards: a survey." Business Process Management Journal (2009). (Year: 2009).*
Beattie, Vivien, and M. Jones. "Corporate reporting using graphs: a review and synthesis." Journal of Accounting Literature 27 (2008): 71-110. (Year: 2008).*
U.S. Appl. No. 16/638,037, "Non-Final Office Action", dated Mar. 31, 2022, 36 pages.
U.S. Appl. No. 16/638,037, "Notice of Allowance", dated Jul. 21, 2022, 15 pages.
Australian Patent Application No. 2017427586, "First Examination Report", dated Oct. 6, 2022, 3 pages.
Beattie, et al., "Corporate Reporting using Graphs: A Review and Synthesis", Journal of Accounting Literature 27, 2008, pp. 71-110.
European Patent Application No. 17921982.9, "Extended European Search Report", dated Mar. 9, 2021, 5 pages.
Javed, et al., "Graphical Perception of Multiple Time Series", IEEE transactions on visualization and computer graphics, vol. 16, Issue 6, 2010, pp. 927-934.
Ko, et al., "Business Process Management (BPM) Standards: A Survey", Business Process Management Journal, 2009.
PCT/US2017/046872, "International Preliminary Report on Patentability", dated Feb. 27, 2020, 9 pages.
PCT/US2017/046872, "International Search Report and Written Opinion", dated Dec. 29, 2017, 16 pages.
Yigitbasioglu, et al., "A Review of Dashboards in Performance Management: Implications for Design and Research", International Journal of Accounting Information Systems, vol. 13, Issue 1, 2012, pp. 41-59.
Canadian Application CA3,072,862 , "Office Action", dated Aug. 22, 2023, 3 pages.

* cited by examiner

TO FIG. 6B

| Min Score | Max Score | Total Number of Accounts | % of Total | Cumulative % of Total | Decrease % of Total | Number of Bads | % of Bad | Cumulative % of Bad | Decrease % of Bad | Number of Good |
|---|---|---|---|---|---|---|---|---|---|---|
| 493 | 590 | 9,766,421 | 4.88 % | 4.88 % | 100.00 % | 208 | 0.02 % | 0.02 % | 100.00 % | 9,766,213 |
| 468 | 492 | 10,546,851 | 5.27 % | 10.16 % | 95.12 % | 503 | 0.04 % | 0.05 % | 99.98 % | 10,546,3... |
| 452 | 467 | 9,526,783 | 4.76 % | 14.92 % | 89.84 % | 873 | 0.07 % | 0.12 % | 99.95 % | 9,525,910 |
| 433 | 451 | 10,016,148 | 5.01 % | 19.93 % | 85.08 % | 1,755 | 0.13 % | 0.26 % | 99.88 % | 10,014,3... |
| 415 | 432 | 10,028,858 | 5.02 % | 24.95 % | 80.07 % | 2,330 | 0.18 % | 0.43 % | 99.74 % | 10,026,5... |
| 395 | 414 | 10,335,963 | 5.17 % | 30.12 % | 75.05 % | 3,362 | 0.26 % | 0.69 % | 99.57 % | 10,332,6 |
| 377 | 394 | 9,549,541 | 4.78 % | 34.89 % | 69.88 % | 4,169 | 0.32 % | 1.01 % | 99.31 % | 9,545,372 |
| 359 | 376 | 10,502,322 | 5.25 % | 40.14 % | 65.11 % | 5,909 | 0.46 % | 1.47 % | 98.99 % | 10,496,3... |
| 345 | 358 | 9,380,829 | 4.69 % | 44.84 % | 59.86 % | 6,786 | 0.52 % | 1.99 % | 98.53 % | 9,374,043 |
| 333 | 344 | 9,909,041 | 4.95 % | 49.79 % | 55.16 % | 8,903 | 0.68 % | 2.67 % | 98.01 % | 9,900,138 |
| 320 | 332 | 10,896,134 | 5.45 % | 55.24 % | 50.21 % | 14,665 | 1.12 % | 3.79 % | 97.33 % | 10,881,4... |
| 310 | 319 | 9,175,607 | 4.59 % | 59.83 % | 44.76 % | 16,192 | 1.24 % | 5.03 % | 96.21 % | 9,159,415 |
| 297 | 309 | 10,256,138 | 5.13 % | 64.96 % | 40.17 % | 25,360 | 1.94 % | 6.98 % | 94.97 % | 10,230.7 |
| 282 | 296 | 10,001,719 | 5.00 % | 69.96 % | 35.04 % | 35,531 | 2.72 % | 9.70 % | 93.02 % | 9,966,188 |
| 262 | 281 | 10,092,297 | 5.05 % | 75.01 % | 30.04 % | 51,679 | 3.96 % | 13.65 % | 90.30 % | 10,040,6 |
| 237 | 261 | 9,828,591 | 4.92 % | 79.92 % | 24.99 % | 73,012 | 5.59 % | 19.25 % | 86.35 % | 9,755,579 |
| 208 | 236 | 9,996,174 | 5.00 % | 84.92 % | 20.08 % | 107,203 | 8.21 % | 27.46 % | 80.75 % | 9,889,511 |
| 180 | 207 | 10,138,765 | 5.07 % | 89.99 % | 15.08 % | 158,175 | 12.11 % | 39.57 % | 72.54 % | 9,980,590 |
| 147 | 179 | 10,010,288 | 5.01 % | 95.00 % | 10.01 % | 243,251 | 18.63 % | 58.20 % | 60.43 % | 9,767,037 |
| 0 | 146 | 10,004,538 | 5.00 % | 100.00 % | 5.00 % | 545,742 | 41.80 % | 100.00 % | 41.80 % | 9,458,795 |

Summary of Model Performance for Selected Sector — 602

Model
- Snapshot
- Time Series
- Attributes

Snapshot Views
- Summary
- Gains Charts
- PSI Score
- Graphs

Observation Archive: February 2014

Model Segment: Overall

FIG. 6A

MODEL PERFORMANCE MONITORING

| % of Good | Cumulative % of Good | Decrease % of Good | Interval Bad Rate | Cumulative Bad Rate | Interval Good Rate | Cumulative Good Rate |
|---|---|---|---|---|---|---|
| 4.92 % | 4.92 % | 100.00 % | 0.00 % | 0.00 % | 100.00 % | 100.00 % |
| 5.31 % | 10.22 % | 95.08 % | 0.00 % | 0.00 % | 100.00 % | 100.00 % |
| 4.80 % | 15.02 % | 89.78 % | 0.01 % | 0.01 % | 99.99 % | 99.99 % |
| 5.04 % | 20.06 % | 84.98 % | 0.02 % | 0.01 % | 99.98 % | 99.99 % |
| 5.05 % | 25.11 % | 79.94 % | 0.02 % | 0.01 % | 99.98 % | 99.99 % |
| 5.20 % | 30.31 % | 74.89 % | 0.03 % | 0.02 % | 99.97 % | 99.98 % |
| 4.80 % | 35.11 % | 69.69 % | 0.04 % | 0.02 % | 99.96 % | 99.98 % |
| 5.28 % | 40.40 % | 64.89 % | 0.06 % | 0.03 % | 99.94 % | 99.97 % |
| 4.72 % | 45.12 % | 59.60 % | 0.07 % | 0.03 % | 99.93 % | 99.97 % |
| 4.98 % | 50.10 % | 54.88 % | 0.09 % | 0.04 % | 99.91 % | 99.96 % |
| 5.48 % | 55.58 % | 49.90 % | 0.13 % | 0.04 % | 99.87 % | 99.96 % |
| 4.61 % | 60.19 % | 44.42 % | 0.18 % | 0.05 % | 99.82 % | 99.95 % |
| 5.15 % | 65.34 % | 39.81 % | 0.25 % | 0.07 % | 99.75 % | 99.93 % |
| 5.02 % | 70.35 % | 34.66 % | 0.36 % | 0.09 % | 99.64 % | 99.91 % |
| 5.05 % | 75.41 % | 29.65 % | 0.51 % | 0.12 % | 99.49 % | 99.88 % |
| 4.91 % | 80.32 % | 24.59 % | 0.74 % | 0.16 % | 99.26 % | 99.84 % |
| 4.98 % | 85.30 % | 19.68 % | 1.07 % | 0.21 % | 98.93 % | 99.79 % |
| 5.02 % | 90.32 % | 14.70 % | 1.56 % | 0.29 % | 98.44 % | 99.71 % |
| 4.92 % | 95.24 % | 9.68 % | 2.43 % | 0.40 % | 97.57 % | 99.60 % |
| 4.76 % | 100.00 % | 4.76 % | 5.45 % | 0.65 % | 94.55 % | 99.35 % |

FROM FIG. 6A

FIG. 6B

| Score Range | Benchmark Population | Benchmark Percentage | Observed Population |
|---|---|---|---|
| (0, 93) | 401,181 | 4.99 % | 265,502 |
| (94, 144) | 399,206 | 4.96 % | 476,513 |
| (145, 170) | 411,166 | 5.11 % | 568,061 |
| (171, 191) | 401,220 | 4.99 % | 593,925 |
| (192, 216) | 394,824 | 4.91 % | 602,295 |
| (217, 242) | 401,164 | 4.99 % | 607,363 |
| (243, 264) | 401,613 | 4.99 % | 593,154 |
| (265, 281) | 420,368 | 5.23 % | 602,530 |
| (282, 293) | 383,566 | 4.77 % | 544,213 |
| (294, 304) | 419,686 | 5.22 % | 591,565 |
| (305, 314) | 384,905 | 4.79 % | 547,639 |
| (315, 325) | 422,160 | 5.25 % | 617,329 |
| (326, 336) | 374,429 | 4.66 % | 551,075 |
| (337, 349) | 398,739 | 4.96 % | 604,172 |
| (350, 365) | 425,877 | 5.29 % | 625,472 |
| (366, 381) | 396,075 | 4.92 % | 579,616 |
| (382, 400) | 393,222 | 4.89 % | 581,268 |
| (401, 421) | 407,738 | 5.07 % | 603,708 |
| (422, 447) | 400,320 | 4.98 % | 606,727 |
| (448, 590) | 405,926 | 5.05 % | 652,684 |
| Grand total | 8,043,385 | 100.00 % | 11,428,811 |

TO FIG. 7B

Model
- Snapshot
- Time Series
- Attributes

Snapshot Views
- Summary
- Gains Charts
- PSI Score
- Graphs

Observation Archive: February 2014

Model Segment: Overall

FIG. 7A

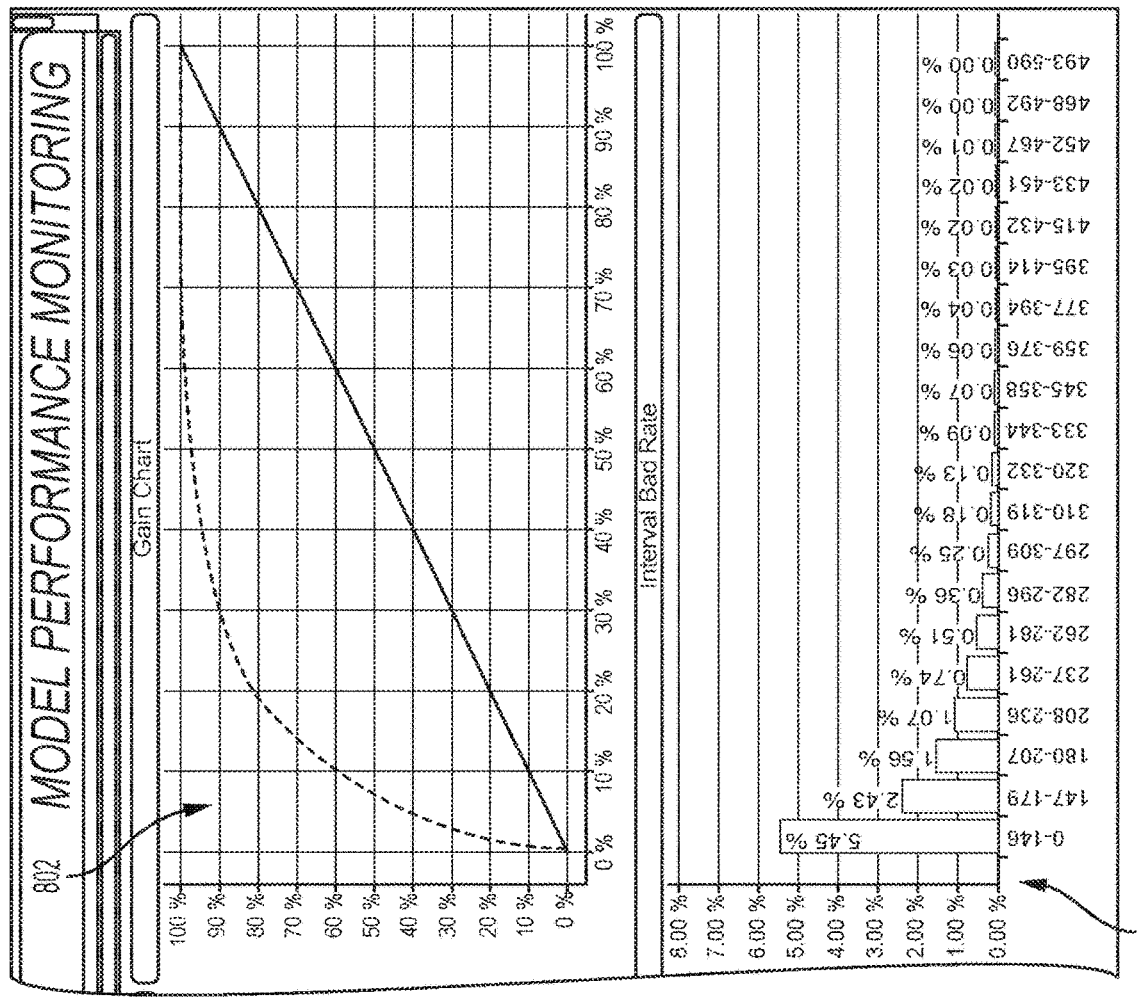

ND MONITORING

INTERACTIVE MODEL PERFORMANCE MONITORING

CROSS-REFERENCES TO RELATED APPLICATIONS

This application is a continuation of and claims priority to and the benefit of U.S. patent application Ser. No. 16/638,037, filed on Feb. 10, 2020, entitled "INTERACTIVE MODEL PERFORMANCE MONITORING," which is a 371 U.S. national stage entry of PCT/US2017/046872, filed Aug. 15, 2017, entitled INTERACTIVE MODEL PERFORMANCE MONITORING," each of which are incorporated by their entireties for all purposes.

TECHNICAL FIELD

This disclosure generally relates to big data processing systems and methods for monitoring the performance and integrity of statistical models. More particularly, this disclosure relates to interactively providing structured, segmented summary performance data related to model performance to a user via a graphical user interface.

BACKGROUND

Automated modeling systems implement automated modeling algorithms (e.g., algorithms using modeling techniques such as logistic regression, neural networks, support vector machines, etc.) that are applied to large volumes of data. This data, which can be generated by or otherwise indicate certain electronic transactions or circumstances, is analyzed by one or more computing devices of an automated modeling system. The automated modeling system can use this analysis to learn from and make predictions regarding similar electronic transactions or circumstances. For example, the automated modeling system can use attributes connected to the data to learn how to generate a value of a response variable, such as a predictive output, involving transactions or other circumstances similar to the attributes from the data.

SUMMARY

Certain aspects and examples are disclosed for providing automated performance monitoring of statistical models from an automated modeling system. The statistical models are based on historical data and attributes that correspond to the data. For example, a processing device is used for performing a statistical analysis on information in at least a first stored archive to extract historical data, scores, and attributes. The processing device calculates performance metrics based at least in part on the historical data, scores, and attributes. The processing device pre-calculates summary performance data based at least in part on the performance metrics. The summary performance data is stored in a plurality of files with predefined layouts, which are in turn stored in a non-transitory, computer-readable medium. Segmented, summary performance data is presented to a user through a graphical user interface (GUI).

BRIEF DESCRIPTION OF THE DRAWINGS

These and other features, aspects, and advantages of the present disclosure are better understood when the following Detailed Description is read with reference to the accompanying drawings.

FIG. 6A and FIG. 6B depict a view of a graphical user interface (GUI) that can be used to present segmented data to a user as overall and segmented reports and receive input from the user according to some aspects of the present disclosure.

FIG. 7A and FIG. 7B depict another view of the GUI that can be used to present segmented data to a user and receive input from the user according to some aspects of the present disclosure.

FIG. 8A and FIG. 8B depict an additional view of the GUI that can be used to present segmented data to a user and receive input from the user according to some aspects of the present disclosure.

DETAILED DESCRIPTION

Figure 1:
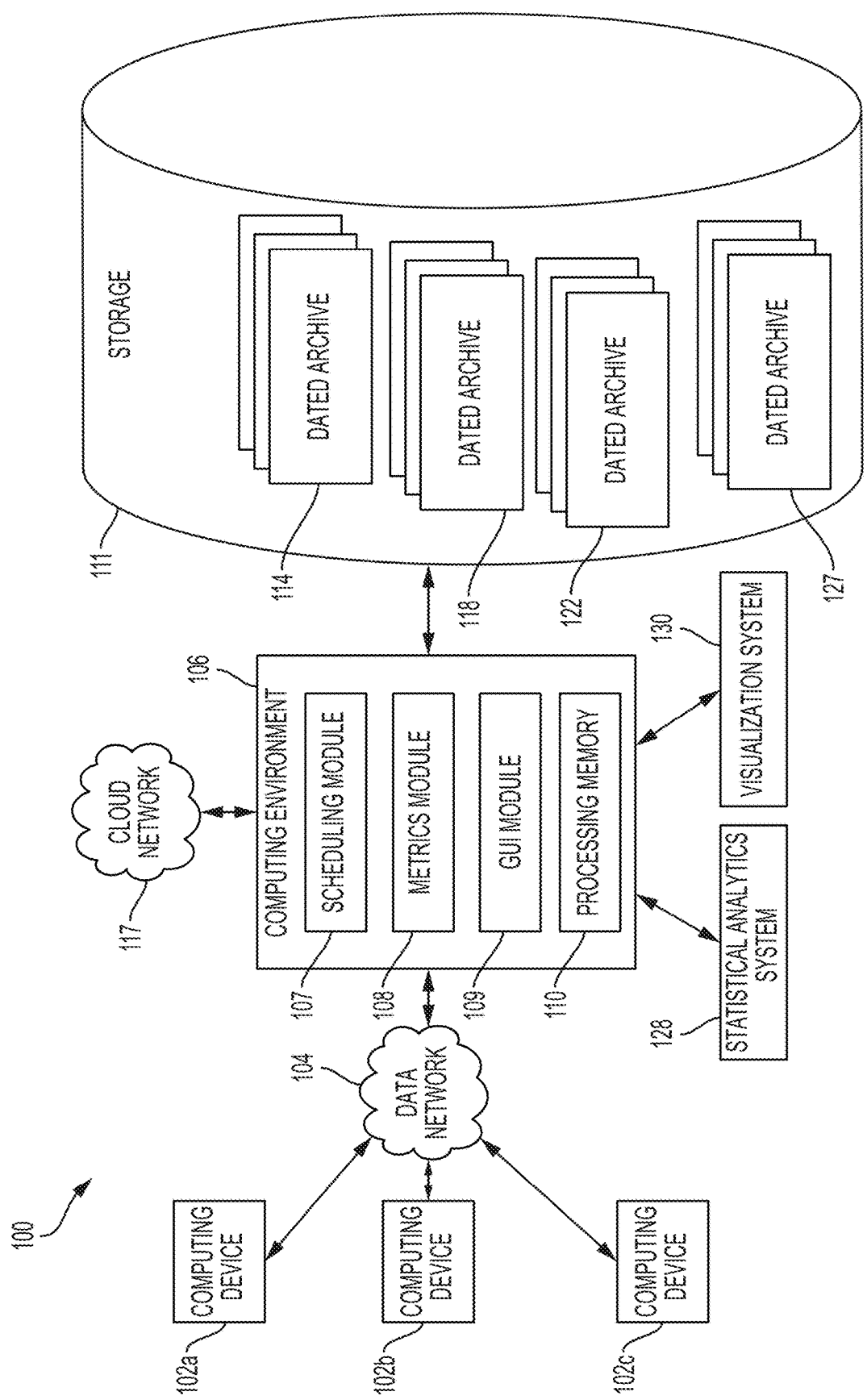
FIG. 1 depicts an example of a computing system that can perform interactive model performance monitoring according to some aspects of the present disclosure.

Certain aspects of this disclosure describe providing automated, interactive performance monitoring of statistical models from an automated modeling system. The statistical models are based on historical data and attributes that correspond to the data (e.g., data related to financial transactions, credit scores, and the like). Historical data includes minimally processed information, often at the account level. Historical data may include information related to numbers of card transactions, past due amounts, age of card transaction, and the like. Attributes are typically calculated at the account level and are related to the behaviors of accountholders.

In some aspects, a processing device is used for performing a statistical analysis on information in at least one dated, stored archive produced by a modeling system and thereby extracting historical data, scores, and attributes. The processing device calculates performance metrics based at least in part on the historical data, scores, and attributes. In one aspect, the processing device uses in-memory processing to calculate the performance metrics so that the calculation can be completed with enhanced speed, as compared to using memory dynamically. Such processing can also be referred to as "in-memory statistics." With in-memory processing, all information needed is read into RAM prior to being processed. The RAM can be distributed across machines or can be in a single server. The systems and methods of the disclosure can provide analytical capabilities to analyze model performance down to the attribute level.

In some aspects, the processing device interactively presents the segmented data by detecting a selection by the user of at least one of a model, a snapshot view, an observation archive, a model segment, or an attribute from among the attributes, and updating the segmented data being presented through the GUI in accordance with the selection. In some aspects, the processing device uses in-memory processing to calculate the performance metrics. In some aspects, the processing device uses updated information from additional archives over time by, for example, detecting the creation of a second stored archive or by accessing the second stored archive at a pre-scheduled time. In this way, continuous performance monitoring can be performed as new statistical data from the modeling system becomes available.

In some aspects, the processing device is part of a server system that also includes a non-transitory computer-readable medium for storing summary performance data in the plurality of files with predefined layouts. The processing device is configured to perform at least some of the operations described above. In some aspects, a non-transitory computer-readable medium includes computer program code that is executable by a processing device to perform at least some of the operations described above.

The processing device pre-calculates summary performance data based at least in part on the performance metrics. The summary performance data is stored in a plurality of files with predefined layouts, which are stored in a non-transitory, computer-readable medium, such as a computer memory, an optical medium, or a magnetic medium and are configured to be accessed based on a selection by the user. By calculating summary performance data in advance, segmented data can be provided interactively to the user in response to user selections with enhanced speed as compared to a hypothetical system that re-calculates data in response to user input. The segmented data is also provided using less processing power and hence less electrical power than would be used in a hypothetical system if the summary performance data were re-calculated based on user input.

Segmented data is presented to a user through a graphical user interface (GUI). In some aspects, the processing device interactively presents various reports of the segmented data by detecting a selection by the user and displaying segmented data from additional pre-defined schedules to the user through the GUI. In some aspects, the processing device is configured to use updated information from additional archives over time by, for example, detecting the creation of a new stored archive or by accessing a new stored archive at a predetermined time. A "new" archive can be an archive that was not previously included in the monitoring activities. For instance, a new archive can be identified by reference to a time stamp associated with the archive. Thus, the system is event triggered. Regular performance monitoring can be carried out as new statistical data from the modeling system becomes available. Email alerts can be provided to users when the system is triggered by the availability of new statistical data. Reports can be available on demand; a user can select specific types of reports and have them available immediately through the GUI. A utility such as a Web-based user interface can be used to receive real-time input directed to modification of a predefined production schedule on which calculations are run, including input directed to triggering certain program components.

Such real-time requests automatically trigger the generation of results, which will then be made available to users as updates to segmented data being presented. The presentation of segmented data is interactive, enabling users to generate desired reports with a few clicks.

As an example, the scores extracted from the statistical model can be risk or marketing scores, and monitoring the performance of the statistical model can enable users to assess whether the model continues to perform as expected, which can assist in providing additional insights into population or attribute shifts. Monitoring model performance can also reveal ways to enhance model performance in the future. Historical data extracted from the statistical model can include, as examples, credit card account data and mortgage account data. Various segmentations of performance modeling data can optionally be provided by a server system through Web-based services that can be accessed from a remotely located computing device, which as examples can be a desktop personal computer, notebook personal computer or a mobile device. In some aspects, the GUI's appearance can be controlled via customization information that is received from a user device and stored by the server system, which then displays the GUI using the customization information. The server system can provide users with an interactive tool that can enable the users to create desired reports with a few selections made through the GUI. These reports can include performance comparisons made over time that can be used to evaluate the ongoing integrity of a model.

The GUI can be made available via Web-based protocols so that user can access performance information from any computer, including a mobile device. The system can provide full automation of model performance monitoring from acquisition of statistical data to display of performance information via a GUI application. The automation reduces FTE hours required to monitor model performance. In one example, FTE hours were reduced by about 80%. Various views can enable performance monitoring over time, stability tracking and root cause diagnostics.

The features discussed herein are not limited to any particular hardware architecture or configuration. A server system, computing device, or computing environment can include any suitable arrangement of components that provide a result conditioned on one or more inputs. Suitable computing systems include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 depicts an example of a computing system 100 that can provide interactive performance monitoring for a statistical modeling system. FIG. 1 depicts examples of hardware components of a computing system 100 according to some aspects. The computing system 100 is a specialized computing system that may be used for processing large amounts of data using a large number of computer processing cycles. The computing system 100 may include a computing environment 106. The computing environment 106 may be a specialized computer or other machine that processes the data received within the computing system 100. The computing environment 106 may include one or more other systems. For example, the computing environment 106 may include a database system for accessing network-attached data stores, a communications grid, or both. A communications grid may be a grid-based computing system for processing large amounts of data. The computing system 100 may also include one or more network-attached data stores 111 for storing dated data archives 114, 118, 122, and 127 that are produced by a statistical modeling system (not shown). In some aspects, the network-attached data stores can also store any intermediate or final data generated by one or more components of the computing system 100, for example, files of summary performance data.

The GUI for input and output can be presented on one or more computing devices 102a, 102b, and 102c, connected to computing environment 106 via a data network 104. In some aspects, data network 104 can include the Internet. Network-attached data stores used in the computing system 100 may also store a variety of different types of data organized in a variety of different ways and from a variety of different sources. For example, network-attached data stores may include storage other than primary storage located within computing environment 106 that is directly accessible by processors located therein. Network-attached data stores may include secondary, tertiary, or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The computing environment 106 can include one or more processing devices that execute program code. The program code, which is stored on a non-transitory computer-readable medium, can include the scheduling module 107. The scheduling module schedules the movement of intermediate and final data produced by computing system 100, determines when it is time to retrieve a new data archive, and determines when to trigger the process of the invention to produce new or updated summary performance data to be stored in files with predefined layouts. The program code can also include metrics module 108. The metrics module 108 can calculate performance metrics using historical data, scores, and attributes extracted from one or more of the data archives 114, 118, 122, and 127. In one aspect, the metrics module calculates performance metrics by first creating standardized industry flags and standardized performance flags. Using standardized flags promotes consistency over time in the way segmented data appears, which allows meaningful comparisons to be made. In one aspect, the metrics module can calculate performance metrics using processing memory 110, which is a portion of RAM managed to be used for in-memory processing. The program code can also include GUI module 109 to provide GUI services. Industry flags define an industry to which a transaction is related. Examples include mortgage, bankcard, and automobile. Performance flags are related to performance measurements such as bankruptcies, collections, and charge offs.

The computing system 100 may also include one or more statistical analytics systems 128. A statistical analytics system can be used to extract historical data, scores, and attributes from a data archive. The statistical analytics system may be accessed over a network or may be part of computing environment 106. An example of a type of statistical analytics system that may be used is one based on SAS software. Computing system 100 may also include a visualization system 130 to format segmented data for display via the GUI. Visualization system 130 can be connected via a network or be incorporated into the computer program code of computing environment 106. As an example, Spotfire® software from TIBCO software, Inc. can be used to implement a visualization system.

The computing system 100 may also include one or more cloud networks 117. A cloud network 117 may include a cloud infrastructure system that provides cloud services. In certain examples, services provided by the cloud network 117 may include a host of services that are made available to users of the cloud infrastructure system on demand. A cloud network 117 is shown in FIG. 1 as being connected to computing environment 106 (and therefore having computing environment 106 as its client or user), but cloud network 117 may be connected to or utilized by any of the devices in FIG. 1. Services provided by the cloud network 117 can dynamically scale to meet the needs of its users. The cloud network 117 may include one or more computers, servers, or systems. In some aspects, one or more end-user computing devices can access the computing environment 106, network-attached data stores included in the computing system 100, the statistical analytics system 128, the visualization system 130, or some combination thereof via the cloud network 117. Cloud network 117 can also optionally house data archives, or implement one or more of a statistical analytics system and a visualization system of the type previously described.

The numbers of devices depicted in FIG. 1 are provided for illustrative purposes. Different numbers of devices may be used. For example, while each device, server, and system in FIG. 1 is shown as a single device, multiple devices may instead be used. Each communication within the computing system 100 (e.g., between client computing devices, between systems 128 or 130 and computing environment 106, or between a server and a device) may occur over one or more data networks 104. Data networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), a wireless local area network ("WLAN"), or a UNIX/Linux/Hadoop HDFS file system framework. A wireless network may include a wireless interface or combination of wireless interfaces. A wired network may include a wired interface. The wired or wireless networks may be implemented using routers, access points, bridges, gateways, or the like, to connect devices in the data network 104. The data networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

Figure 2:
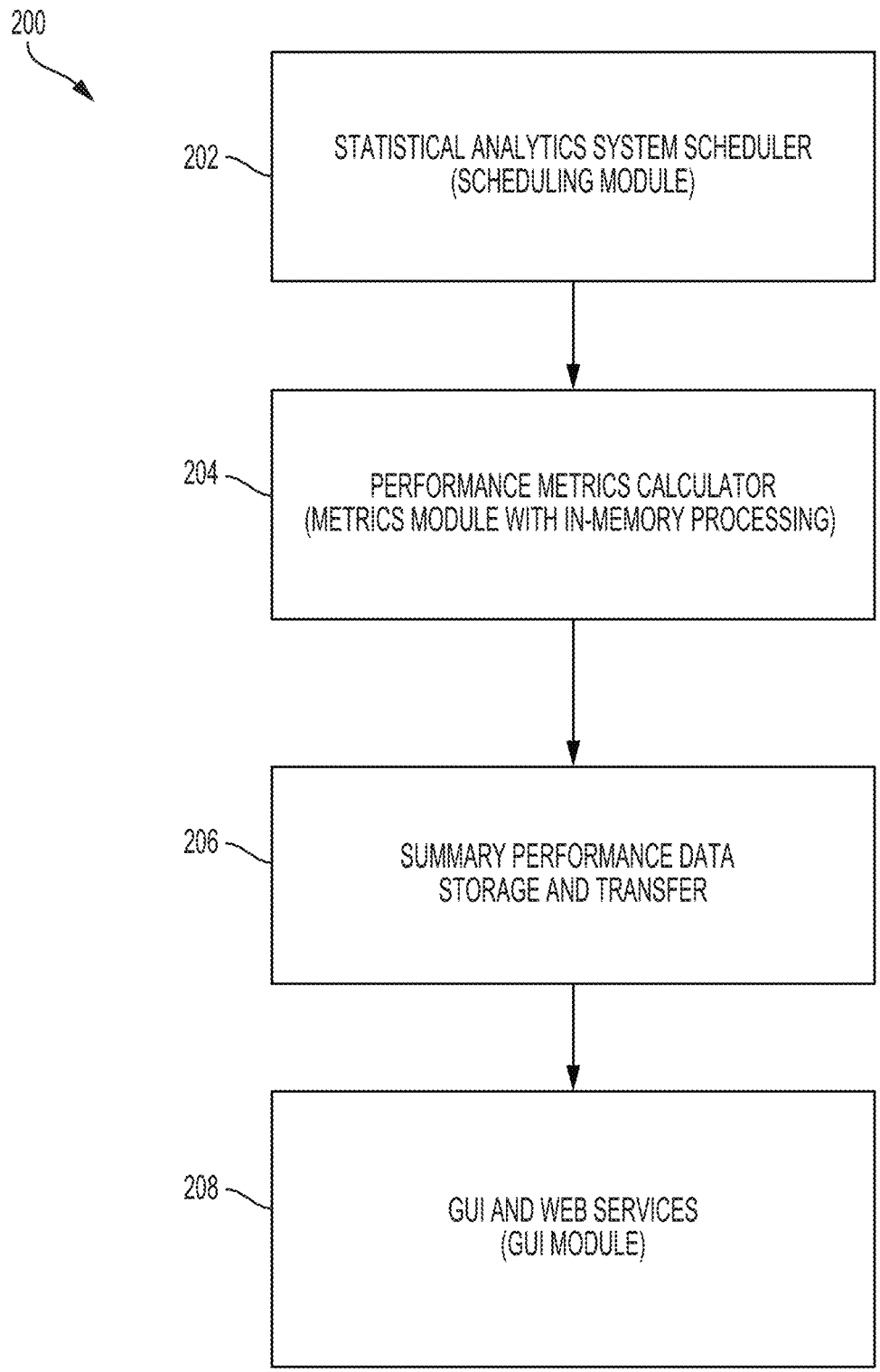
FIG. 2 depicts examples of tasks performed by software modules that reside in the computing system of FIG. 1.

FIG. 2 illustrates a number of software entities that can be used within the computing environment in some aspects as well as the entity relationship 200 of the various entities to one another. In the example of FIG. 2, a statistical analytics system scheduler 202 determines when to trigger the statistical analytics system to extract historical data, scores, and attributes from an archive produced by an automated modeling system. In this example, the statistical analytics system scheduler is part of the scheduling module 107 of FIG. 1. The information extracted from the archive is provided to a performance metrics calculator 204, which in this example is part of the metrics module 108 of FIG. 1. The performance metrics calculator 204, in one aspect, accesses the processing memory 110 of FIG. 1. A summary performance data storage and transfer entity 206 is also part of the scheduling module 107 of FIG. 1 in this example. The summary data storage and transfer entity, in one aspect, manages the creation and storage of the summary performance data in the files with predefined layouts. The GUI and Web services entity 208 manages the GUI and Web services. In one aspect, the GUI and Web services entity 208 receives summary performance data and communicates with visualization system 130 of FIG. 1. The GUI and Web services entity 208 is part of GUI module 109 of FIG. 1.

Figure 3:
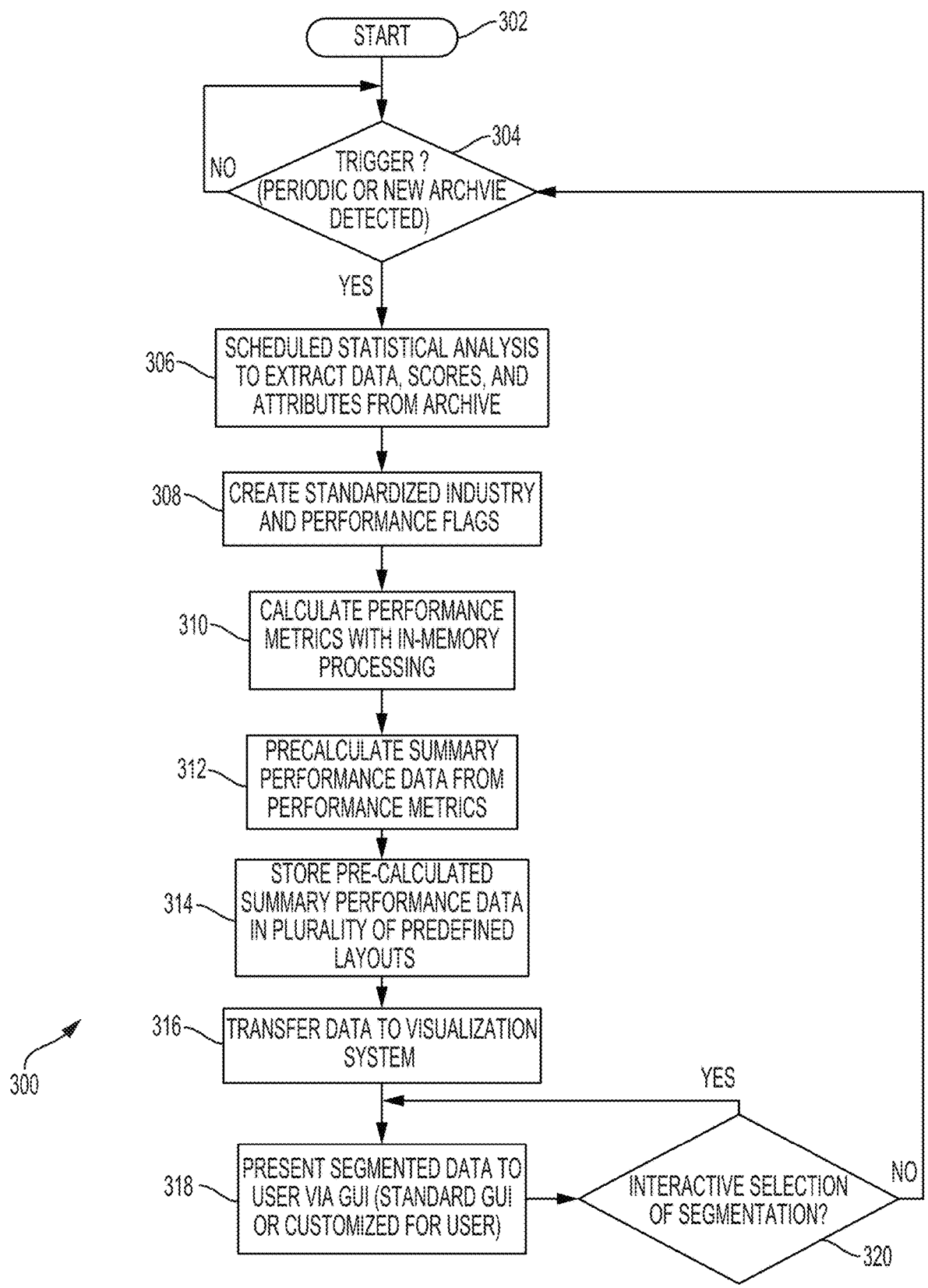
FIG. 3 depicts an example of a method for interactive performance monitoring according to some aspects of the present disclosure.

FIG. 3 is a flowchart depicting an example of a method 300 for interactive model performance monitoring. For illustrative purposes, the method 300 is described with reference to the implementation depicted in FIG. 1 and various other examples described herein. But other implementations are possible. The method 300 begins at block 302. At block 304, scheduling module 107 waits for a trigger event to begin a scheduled statistical analysis. Examples of this trigger event can include the occurrence of a specified time from a schedule, periodic statistical analytics performed against any new archive (a "first" archive), and detection of a new archive being written to storage 111. At block 306, the statistical analysis if performed to on information in a stored archive to extract historical data, scores and attributes.

Continuing with FIG. 3, at block 308, standardized industry flags and standardized performance flags are created. Using standardized flags promotes consistency over time in the way segmented data appears. At block 310, performance metrics are calculated from the historical data, scores, and attributes using the standardized industry flags and standardized performance flags. In some aspects, the calculations at block 310 are performed by metrics module 108 using processing memory 110 in computing environment 106. At block 312, summary performance data is pre-calculated from the performance metrics. At block 314, the pre-calculated summary performance data is stored in files with predefined layouts in a non-transitory computer-readable medium. At block 316, the summary performance data is transferred to visualization system 130 of FIG. 1. Performance metrics reflect how a model performs and can include, as examples, attribute population stability index (PSI) and bad capture rates. Summary performance data is also performance metrics, but summarized at the segment level.

A scheduling facility can be used to automatically run calculations on a pre-defined production schedule, creating sets of summarized datasets and measurements that become accessible quickly for display to users. Segmented performance measurement data, if it is based on resource intensive computations with very large datasets, can be generated on a pre-defined schedule in a distributed computing environment. A utility such as a Web-based user interface can be used to receive input to modify the production schedule and parameters, including input to trigger certain program components in real time. Such real-time requests automatically trigger the generation of results, which will then be made available to users as updated, segmented data.

Still referring to FIG. 3, segmented data in this example is presented to a user at block 318 by the GUI module 109 of FIG. 1. At block 320, the computing environment 106 waits for any input from the user that is indicative of selecting a different view or segmentation for display. If such input is received, the selected data is presented at block 318. Otherwise, the current process is complete and processing returns to waiting for a trigger at block 304. IN some aspects, the trigger may include a pre-scheduled time at which information from a second stored archive is obtained.

Computer System Examples

Figure 4:
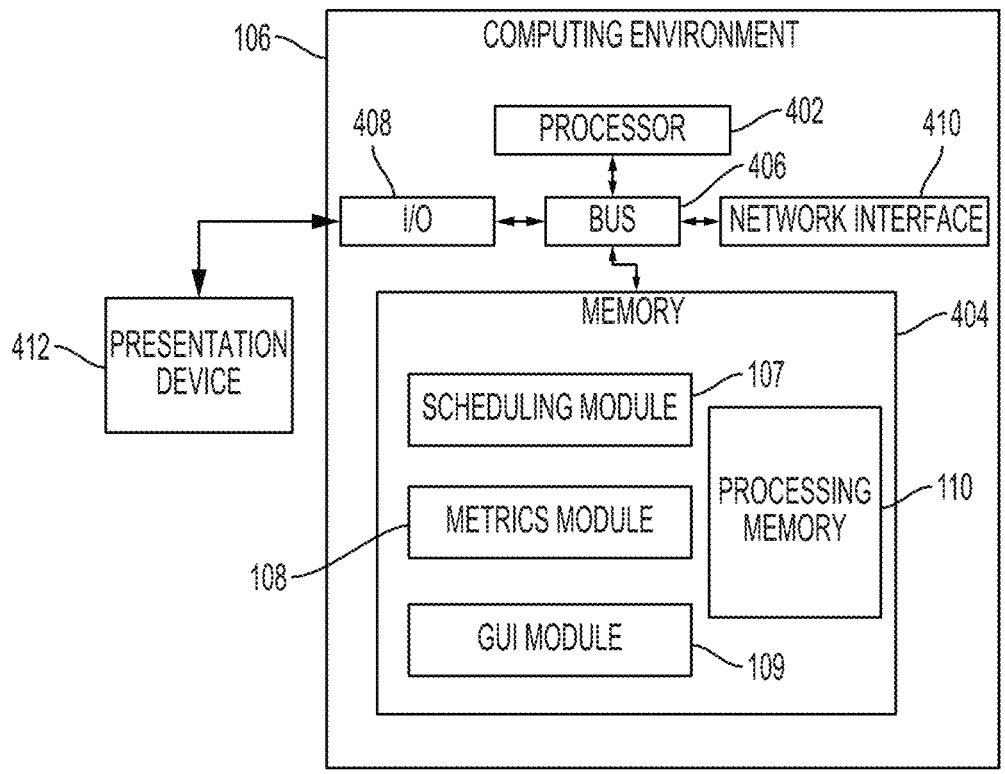
FIG. 4 depicts an example of a computing environment that can be used in providing interactive model performance monitoring according to some aspects of the present disclosure.

Any suitable computing system or group of computing systems can be used to perform the attribute-creation operations described herein. For example, FIG. 4 is a block diagram depicting an example of a computing environment 106. The example of the computing environment 106 can include various devices for communicating with other devices in the computing system 100, as described with respect to FIG. 1. The computing environment 106 can include various devices for performing one or more of the operations described above with respect to FIGS. 1-3.

The computing environment 106 can include a processor 402 that is communicatively coupled to a memory 404. The processor 402 executes computer-executable program code stored in the memory 404, accesses information stored in the memory 404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 402 include a microprocessor, an application-specific integrated circuit, a field-programmable gate array, or any other suitable processing device. The processor 402 can include any number of processing devices. The processor 402 can include or communicate with a memory 404. The memory 404 stores program code that, when executed by the processor 402, causes the processor to perform the operations described in this disclosure.

The memory 404 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language.

The computing environment 106 may also include a number of external or internal devices such as input or output devices. For example, the computing environment 106 is shown with an input/output interface 408 that can receive input from input devices or provide output to output devices. A bus 406 can also be included in the computing environment 106. The bus 406 can communicatively couple one or more components of the computing environment 106.

The computing environment 106 can execute program code that includes one or more of the scheduling module 107, the metrics module 108, and the GUI module 109. The program code for these modules may be resident in any suitable computer-readable medium and may be executed on any suitable processing device. For example, as depicted in FIG. 4, the program code for the scheduling module 107, metrics module 108, and GUI module 109 can reside in the memory 404 at the computing environment 106. Executing these modules can configure the processor 402 to perform the operations described herein. As previously discussed, the metrics module 108 can make use of processing memory 110 that is part of the memory of computing environment 106.

In some aspects, the computing environment 106 can include one or more output devices. One example of an output device is the network interface device 410 depicted in FIG. 4. A network interface device 410 can include any device or group of devices suitable for establishing a wired or wireless data connection to one or more data networks 104. Non-limiting examples of the network interface device 410 include an Ethernet network adapter, a modem, etc.

Another example of an output device is the presentation device 412 depicted in FIG. 4. A presentation device 412 can include any device or group of devices suitable for providing visual, auditory, or other suitable sensory output. Non-limiting examples of the presentation device 412 include a touchscreen, a monitor, a speaker, a separate mobile computing device, etc.

Figure 5:
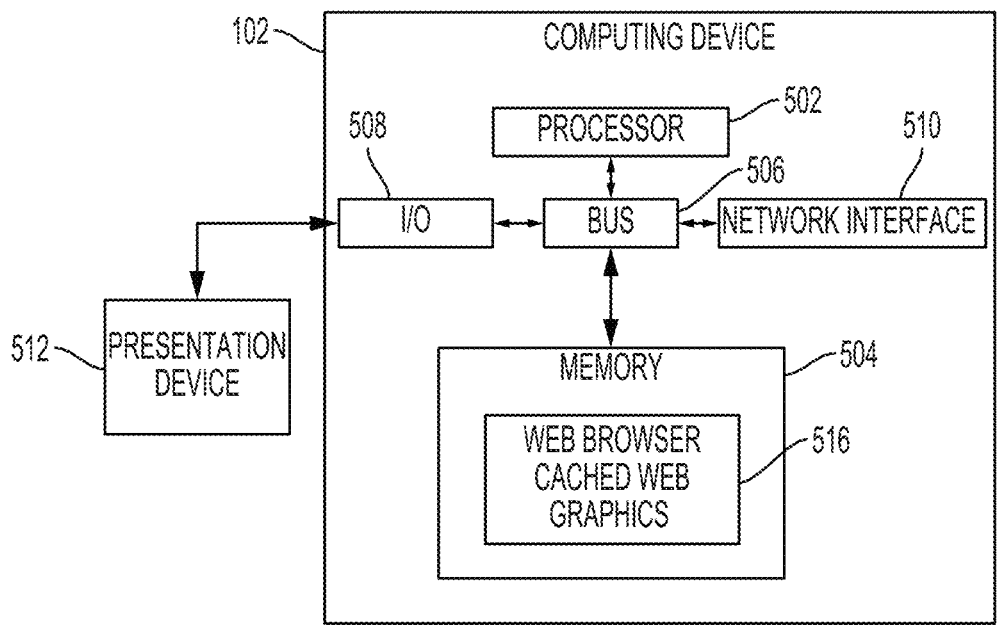
FIG. 5 depicts an example of a remote computing device that can be used to present segmented data to a user as overall and segmented reports according to some aspects of the present disclosure.

FIG. 5 is a block diagram depicting an example of a computing device 102, such as the client computing devices 102a, 102b, and 102c of FIG. 1. The computing device 102 can include a processor 502 that is communicatively coupled to a memory 504. The processor 502 executes computer-executable program code stored in the memory 504, accesses information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 502 include a microprocessor, an application-specific integrated circuit, a field-programmable gate array, or any other suitable processing device. The processor 502 can include any number of processing devices. The processor 502 can include or communicate with a memory 504. The memory 504 stores program code that, when executed by the processor 502, causes the processor to display a GUI including segmented data from a pre-defined schedule as previously discussed herein. In some aspects, the program code can include a Web browser with cached Web graphics 516. The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language.

Still referring to FIG. 5, the computing device 102 may also include a number of external or internal devices such as input or output devices. For example, the computing device 102 is shown with an input/output interface 508 that can receive input from input devices or provide output to output devices. A bus 506 can also be included in the computing device 102.

The bus 506 can communicatively couple one or more components of the computing device 102. The computing device 102 can execute program code that includes a Web browser to display and manipulate cached Web graphics and other Web-based information.

GUI Examples

FIG. 6A and FIG. 6B depict a view 600 of an example GUI for interactive model performance modeling. View 600 includes a single data display area 602 and an input area 606. Input area 606 includes model "radio" buttons 607 and snapshot view "radio" buttons 608. The snapshot view buttons change as appropriate to indicate snapshot views that are available for the particular model chosen. Selections are indicated by highlighting in FIG. 6A and FIG. 6B. Dropdown 610 allows a user to choose the dated archive on which the displayed data is based. Dropdown 613 allows a user choose a segmentation to be displayed. The view panel may have additional input controls, which can be revealed by sliding the scroll bar 616. Note that in this particular view 600, a "snapshot" model is selected, and a snapshot view of a "gains chart" is also selected. These selections display a tabular summary of model performance for a selected sector.

Figure 7B:
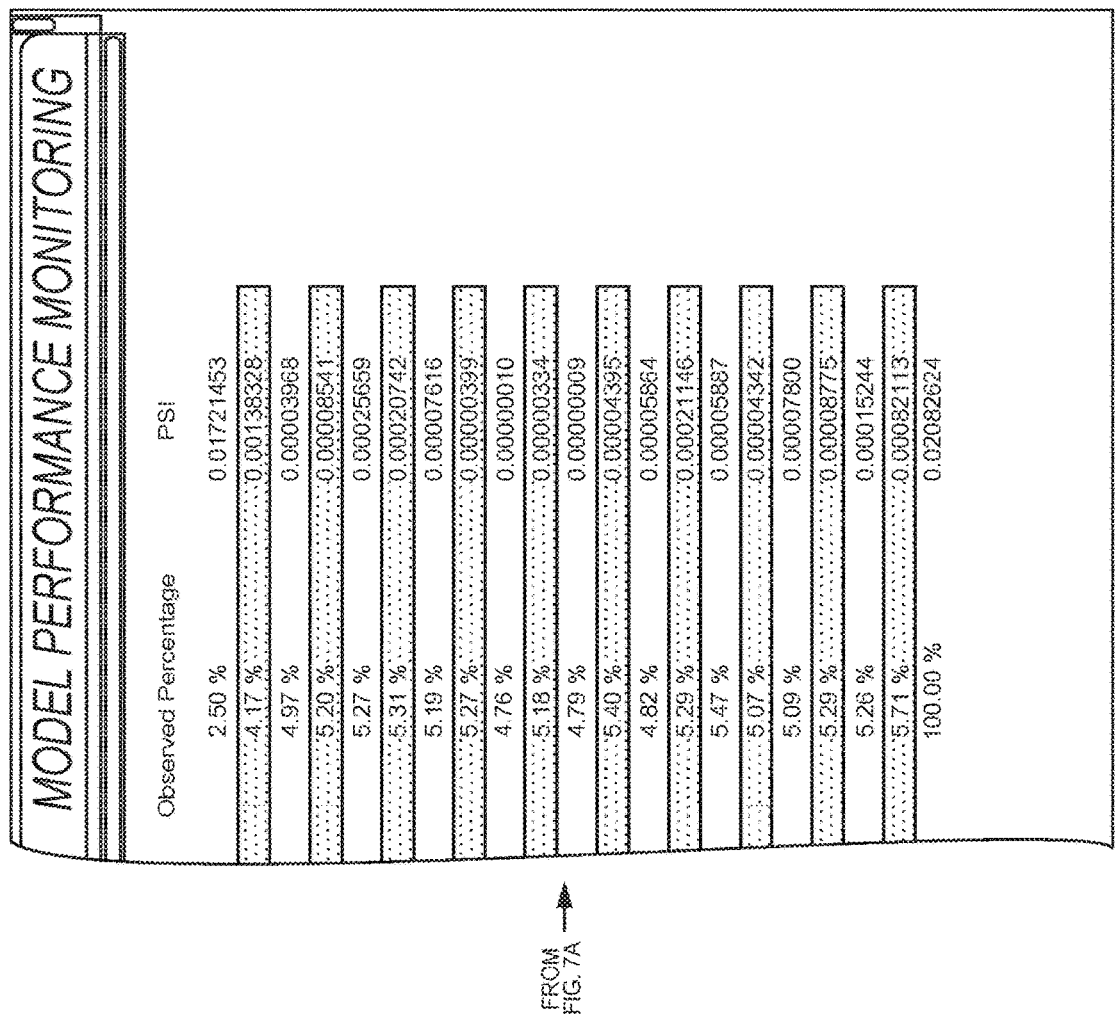

FIG. 7A and FIG. 7B depict a view 700 of the example GUI for interactive model performance modeling. View 700 includes a single data display area 702 and an input area 706, each of which represents changes as compared to what was displayed in view 600 of FIG. 6A and FIG. 6B. Input area 706 includes the same model "radio" buttons 607, however snapshot view "radio" buttons 708 have changed in that the "PSI Score" view is selected. Dropdowns 610 and 613, as well as scroll bar 616 are unchanged from FIG. 6A and FIG. 6B. These selections display tabular fields of a benchmark population, a benchmark percentage, an observed population, an observed percentage, and a PSI score all for various credit score ranges.

Figure 8A:
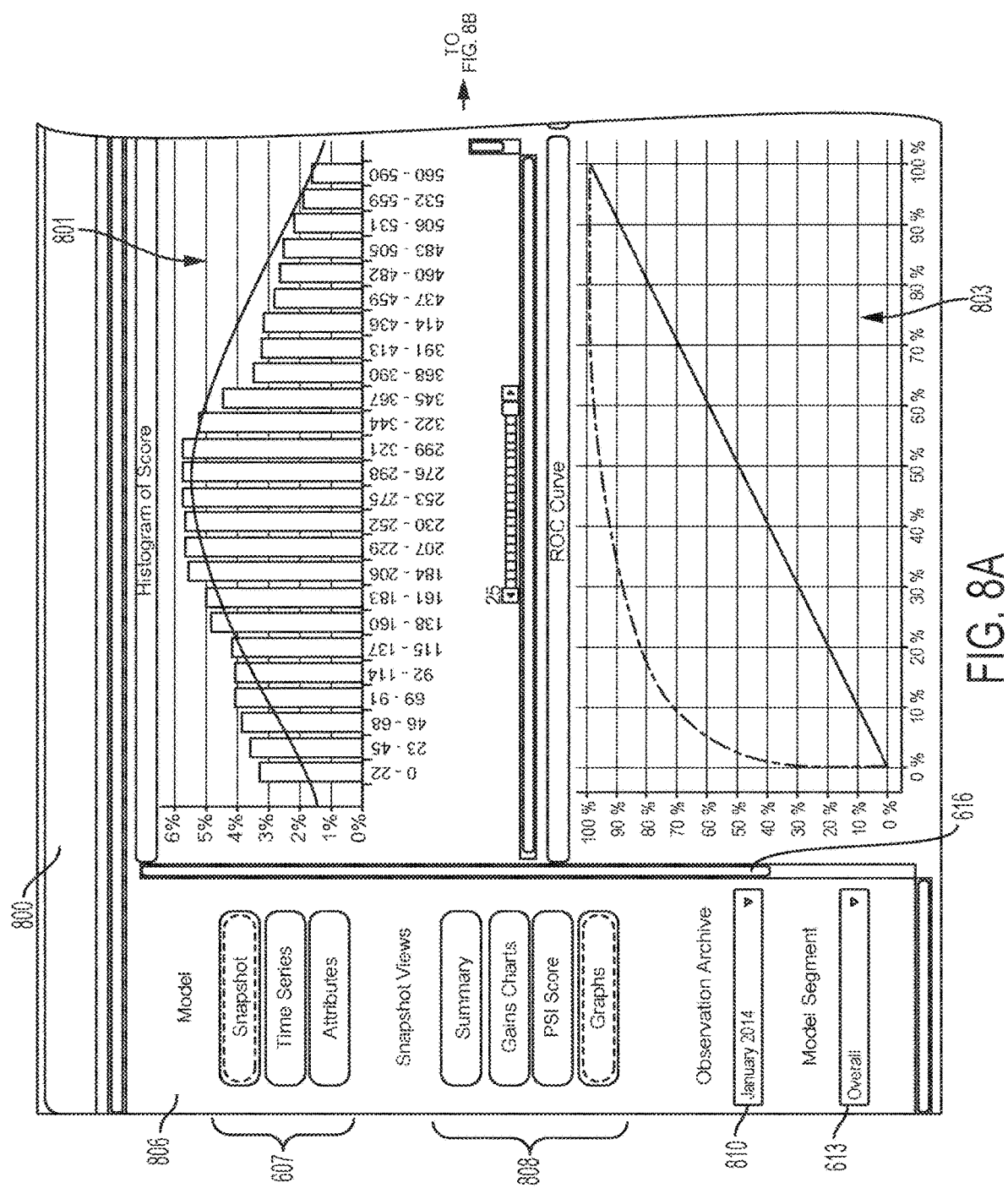

FIG. 8A and FIG. 8B depict a view 800 of the example GUI for interactive model performance modeling. View 800 includes four display areas, 801, 802, 803, and 804. View 800 also includes input area 806. Input area 806 includes the same model "radio" buttons 607 as displayed in the previous two GUI views, however snapshot view "radio" buttons 808 have changed in that the "graphs" view is selected. Dropdown 613 and scroll bar 616 are unchanged from FIG. 6A and FIG. 6B. Dropdown 810 has now been used to select a different dated archive; one from January, 2014 as opposed to February, 2014 as in the previous GUI views. Scroll bar 616 is unchanged. The user selections in view 800 display a histogram of credit score in display area 801, a gain chart in display area 802, a receiver operating characteristic (ROC) curve in display area 803, and an interval bad rate in display area 804.

Figure 9A:
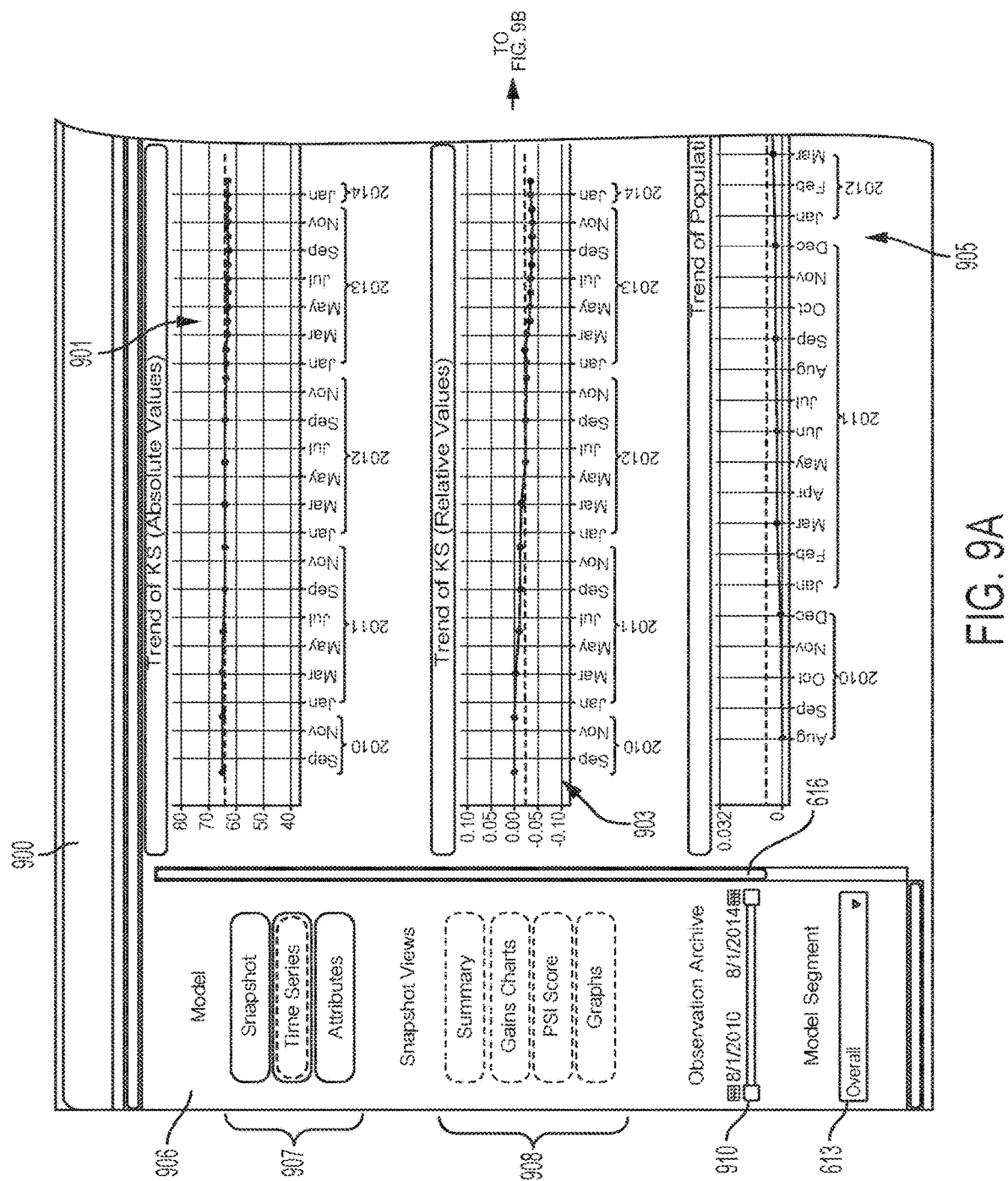
FIG. 9A and FIG. 9B depict a further view of the GUI that can be used to present segmented data to a user and receive input from the user according to some aspects of the present disclosure.
Figure 9B:
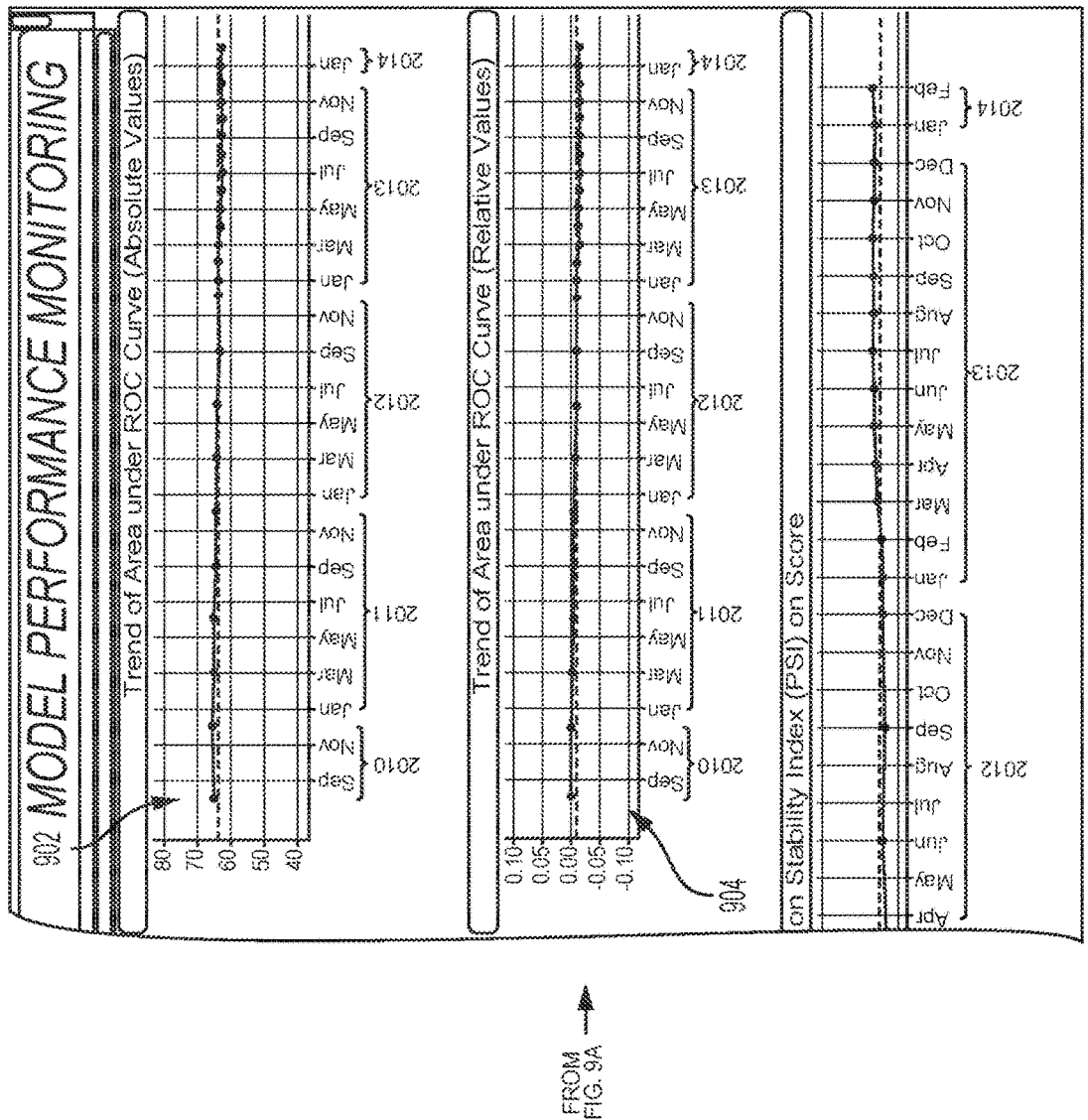

FIG. 9A and FIG. 9B depict a view 900 of the example GUI for interactive model performance modeling. View 900 includes five display areas, 901, 902, 903, 905, and 905. View 900 also includes input area 906. Input area 906 has changed from any of the input areas in the previous views in accordance with user selections. In view 900, the user has selected a time series model using "radio" buttons 907.

Snapshot view "radio" buttons 908 are now "greyed out" since multiple view are not available for a time series model. The observation archive dropdown has been replaced with observation archive slider 910 to select archives within a specified data range. Dropdown 613 and scroll bar 616 are unchanged from previous figures. The user selections in view 900 display absolute values of the trend of Kolmogorov (KS) Smirnov statistics in display area 901, absolute values of the trend of the area under the ROC curve in display area 902, relative values of the trend of KS statistics in display area 903, relative values of the trend of the area under the ROC curve in display area 904, and the trend of the PSI score relative to credit score in display area 905.

Figure 10A:
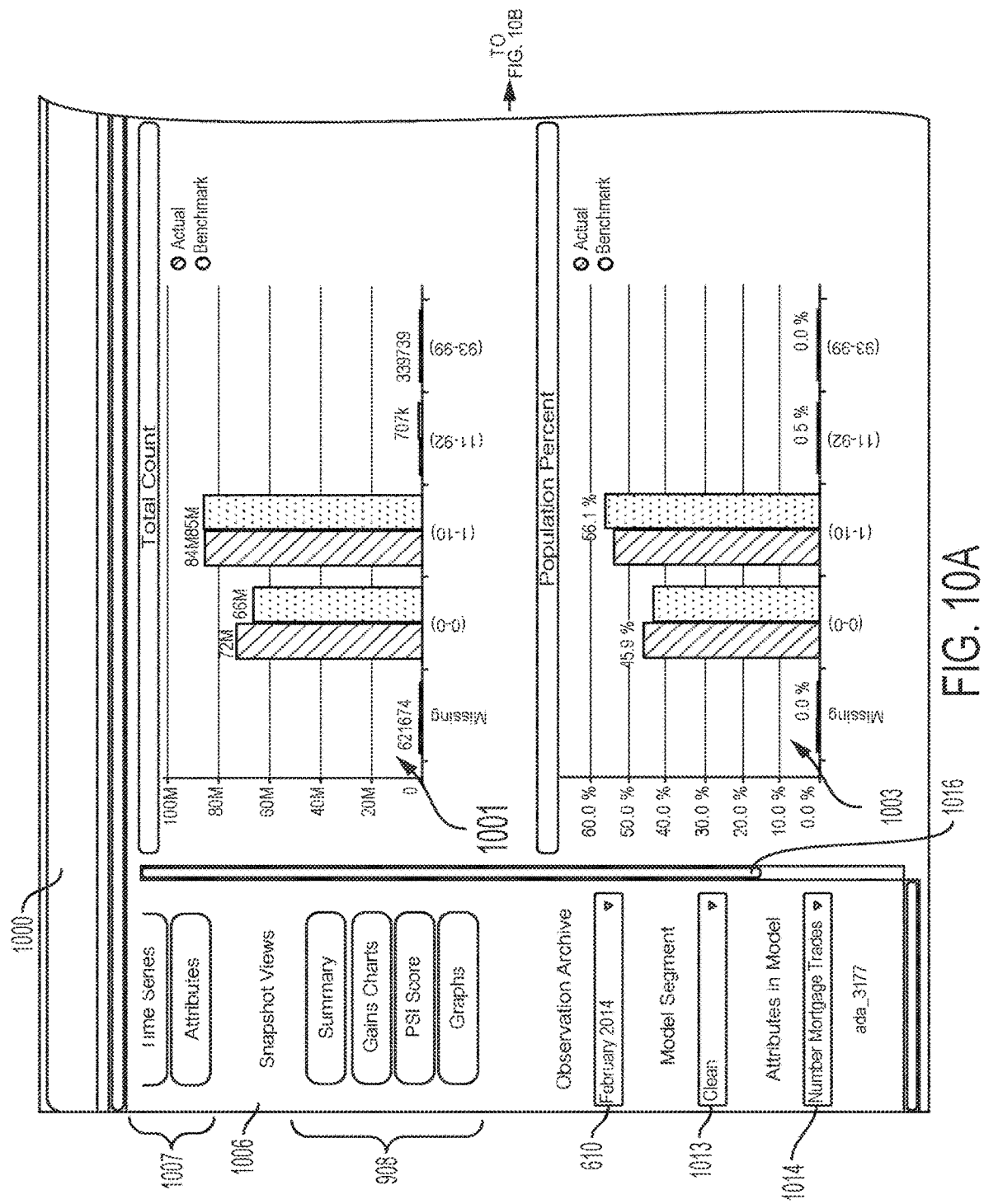
FIG. 10A and FIG. 10B depict an additional view of the GUI that can be used to present segmented data to a user and receive input from the user according to some aspects of the present disclosure.
Figure 10B:
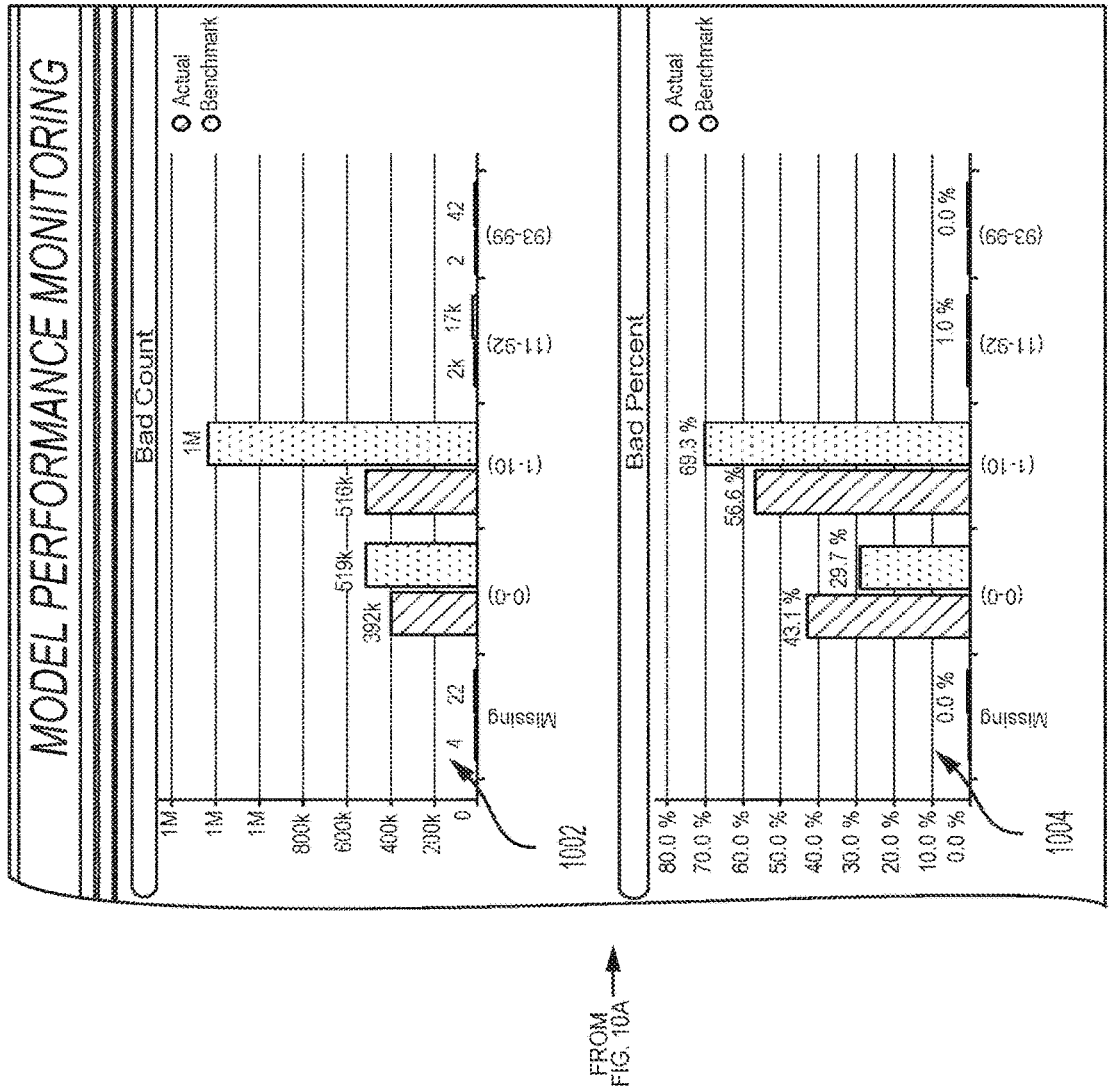

FIG. 10A and FIG. 10B depict a view 1000 of the example GUI for interactive model performance modeling. View 1000 includes four display areas, 1001, 1002, 1003, and 1004. View 1000 also includes input area 1006. Input area 1006 has changed from any of the input areas in the previous views in accordance with user selections. In view 1000, the user has selected attributes model using "radio" buttons 1007. Snapshot view "radio" buttons 908 are "greyed out" since multiple snapshot views are not available for a time series model. The observation archive dropdown 610 is again present in this GUI view 1000. Dropdown 1013 is present and shows a user selection of a clean model segment. Scroll bar 1016 has been scrolled down, revealing an attribute selection dropdown 1014. In this case, the user has selected the number of mortgage trades as an attribute. The user selections in view 1000 display a total count in display area 1001, a bad count in display area 1002, population percent in display area 1003, and bad percent in display area 1005.

Figure 11A:
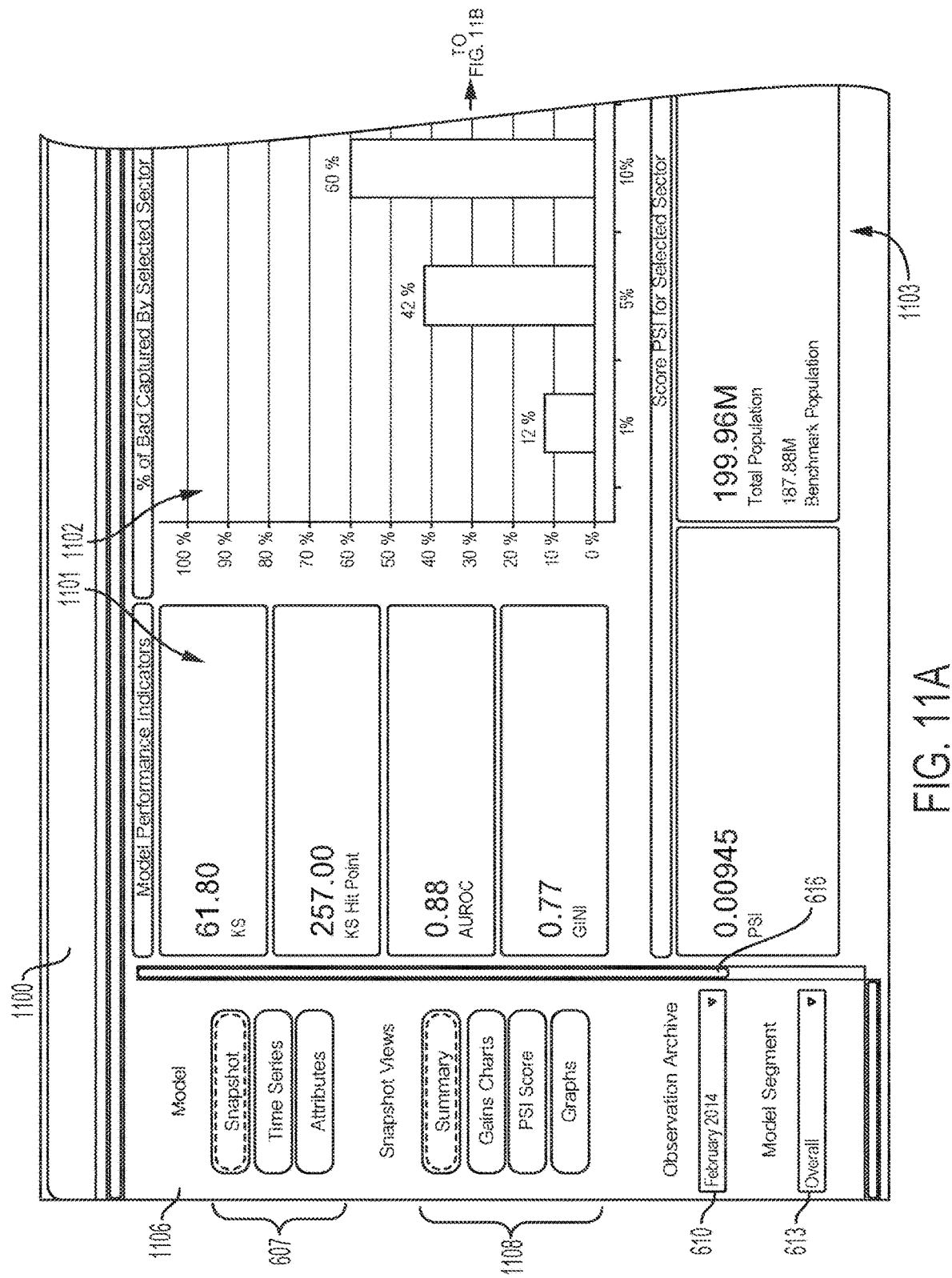
FIG. 11A and FIG. 11B depict a further additional view of the GUI that can be used to present segmented data to a user and receive input from the user according to some aspects of the present disclosure.
Figure 11B:
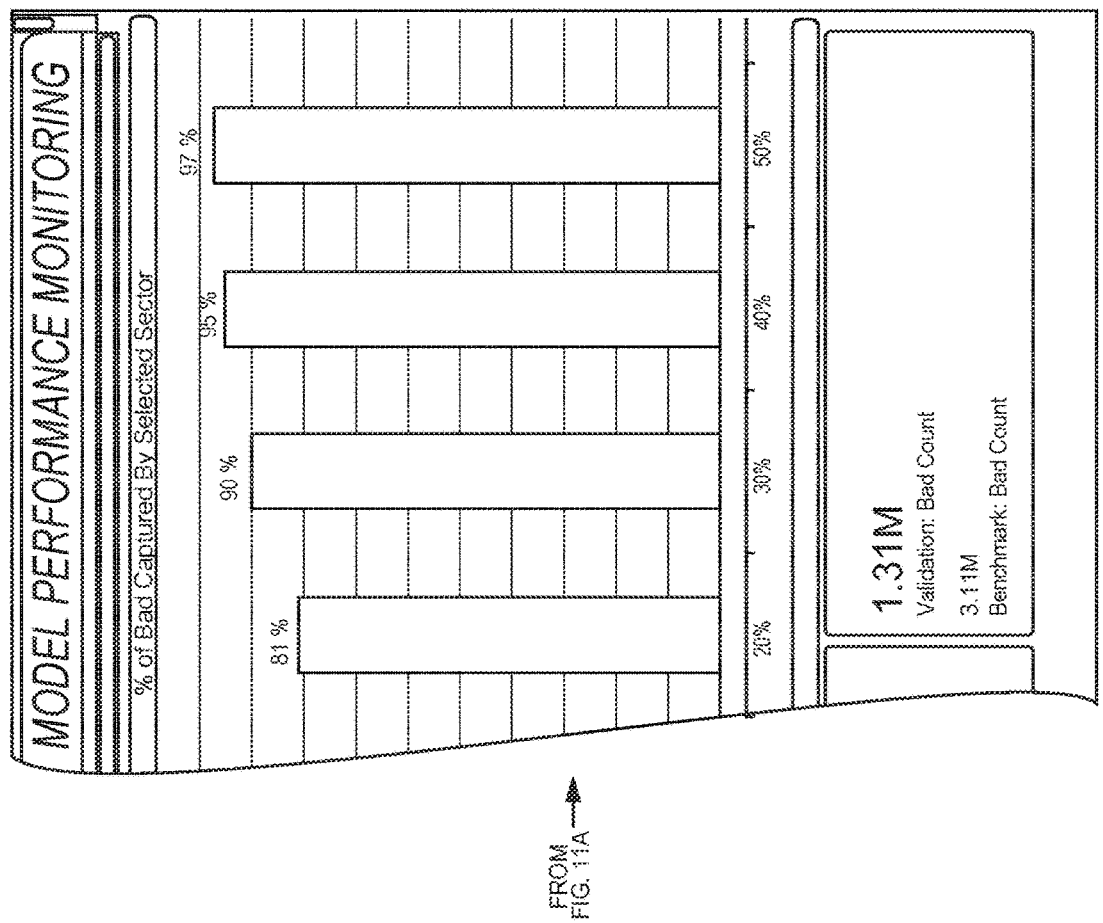

FIG. 11A and FIG. 11B depict a view 1100 of the example GUI for interactive model performance modeling. View 1100 includes three display areas, 1101, 1102, and 1103. View 1100 also includes input area 1106. Input area 1106 has changed from any of the input areas in the previous views in accordance with user selections. While view 1100, the user has again selected snapshot model using "radio" buttons 607, the user has this time selected a summary snapshot view with radio buttons 1108. The observation archive dropdown 610 is again present in this GUI view 1100. Dropdown 613 is present and shows a user selection of an overall model segment. Scroll bar 616 so scrolled to the top. In this case, the user has selected the number of mortgage trades as an attribute. The user selections in view 1100 display model performance indicator in display area 1101, a percent of bad captured in display area 1102, and a PSI score for the selected sector in display area 1103.

As can be observed in reviewing the GUI views depicted in FIGS. 6A-11B, the information being presented through the GUI can be interactively and dynamically updated in response to interactive user input to create a report presented through the GUI. The term "interactively" refers to the ability of the user to control the GUI view and what information is displayed. The term "dynamically" refers to the fact that using pre-calculated summary performance data stored following a predefined layout allow the updated to take place very quickly, such that a user would perceive them occurring in real time since new calculations do not need to be performed when the selection changes.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," and "determining" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples.

Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A system comprising:
  a non-transitory computer-readable medium; and
  a processing device communicatively connected to the non-transitory computer-readable medium, wherein the processing device is configured to perform operations comprising:
    detecting data movement of a first dated, stored archive produced by a statistical modeling system;

generating, responsive to detecting the data movement, a trigger event indicating that the first dated, stored archive is written to the non-transitory computer-readable medium;

responsive to the trigger event, extracting historical data, scores, and attributes from a statistical analysis performed on information in the first dated, stored archive;

determining one or more standardized flags based on the historical data, scores, and attributes;

calculating, via in-memory processing, performance metrics based at least in part on (i) the historical data, scores, and attributes being read into a managed portion of random access memory (RAM) for the in-memory processing and (ii) the one or more standardized flags, the performance metrics indicating performance of the statistical modeling system that produced the first dated, stored archive;

interactively presenting segmented data from at least one file with a predefined layout to a user through a graphical user interface (GUI); and responsive to an additional trigger event indicating that a second dated, stored archive produced by the statistical modeling system is written to the non-transitory computer-readable medium, updating the segmented data being presented to the user based on information in the second dated, stored archive.

2. The system according to claim 1, wherein the non-transitory computer-readable medium is configured to store a plurality of files with summary performance data, and the processing device is configured to calculate and store the summary performance data based at least in part on the performance metrics being summarized at a segment level, the summary performance data being stored in the plurality of files with predefined layouts configured to be accessed based on a selection by the user.

3. The system according to claim 2, wherein the processing device is configured for interactively presenting views of the segmented data by performing operations comprising:
interactively detecting the selection, by the user, of at least one of a model, a snapshot view, an observation archive, a model segment, or an attribute; and
interactively updating the segmented data being presented through the GUI in accordance with the selection.

4. The system according to claim 2, wherein the processing device is configured to calculate and store the summary performance data by performing operations comprising:
calculating and storing the summary performance data on a predefined schedule;
receiving real-time input directed to modification of the predefined schedule; and
updating the segmented data being presented in response to the real-time input.

5. The system according to claim 1, wherein the processing device is configured to access the second dated, stored archive by performing operations comprising detecting a creation of the second dated, stored archive and accessing the second dated, stored archive at a pre-scheduled time.

6. The system according to claim 1, wherein calculating the performance metrics using the in-memory processing includes reading all of the historical data, scores, and attributes into the managed portion of the RAM prior to being processed.

7. The system according to claim 1, wherein the processing device is configured for presenting the segmented data through the GUI in part by making the segmented data accessible by a data visualization system.

8. The system according to claim 1, wherein the processing device is configured to customize the GUI for the user by performing operations comprising:
receiving customization information for the GUI; and
displaying the GUI using the customization information.

9. The system according to claim 1, wherein the determining the one or more standardized flags further comprises:
creating standardized industry flags and standardized performance flags using the historical data, scores, and attributes; and
calculating the performance metrics based at least in part on the standardized industry flags and the standardized performance flags.

10. A method comprising one or more processing devices performing operations comprising:
detecting data movement of a first dated, stored archive produced by a statistical modeling system;
generating, responsive to detecting the data movement, a trigger event indicating that the first dated, stored archive is written to a non-transitory computer-readable medium;
responsive to the trigger event, extracting historical data, scores, and attributes from a statistical analysis performed on information in the first dated, stored archive;
determining one or more standardized flags based on the historical data, scores, and attributes;
calculating, via in-memory processing, performance metrics based at least in part on (i) the historical data, scores, and attributes being read into a managed portion of random access memory (RAM) for the in-memory processing and (ii) the one or more standardized flags, the performance metrics indicating performance of the statistical modeling system that produced the first dated, stored archive;
interactively presenting segmented data from at least one file with a predefined layout to a user through a graphical user interface (GUI); and
responsive to an additional trigger event indicating that a second dated, stored archive produced by the statistical modeling system is written to the non-transitory computer-readable medium, updating the segmented data being presented to the user based on information in the second dated, stored archive.

11. The method of claim 10, wherein the operations further comprise calculating and storing summary performance data based at least in part on the performance metrics being summarized at a segment level, the summary performance data being stored in a plurality of files with predefined layouts configured to be accessed based on a selection by the user.

12. The method of claim 11, wherein the operations further comprise:
interactively detecting an additional selection, by the user, of at least one of a model, a snapshot view, an observation archive, a model segment, or an attribute from among the attributes; and
interactively updating the segmented data being presented through the GUI in accordance with the selection.

13. The method according to claim 10, wherein the calculating of the performance metrics using the in-memory processing includes reading all of the historical data, scores, and attributes into the managed portion of the RAM prior to being processed.

14. The method according to claim 10, wherein the determining the one or more standardized flags further comprises:

creating standardized industry flags and standardized performance flags using the historical data, scores, and attributes; and calculating the performance metrics based at least in part on the standardized industry flags and the standardized performance flags.

15. A non-transitory computer-readable medium having program code that is executable by a processing device to cause a server system to perform operations, the operations comprising:

detecting data movement of a first dated, stored archive produced by a statistical modeling system;

generating, responsive to detecting the data movement, a trigger event indicating that the first dated, stored archive is written to the non-transitory computer-readable medium;

responsive to the trigger event, extracting historical data, scores, and attributes from a statistical analysis performed on information in the first dated, stored archive;

determining one or more standardized flags based on the historical data, scores, and attributes;

calculating, via in-memory processing, performance metrics based at least in part on (i) the historical data, scores, and attributes being read into a managed portion of random access memory (RAM) for the in-memory processing and (ii) the one or more standardized flags, the performance metrics indicating performance of the statistical modeling system that produced the first dated, stored archive;

interactively presenting segmented data from at least one file with a predefined layout to a user through a graphical user interface (GUI); and responsive to an additional trigger event indicating that a second dated, stored archive produced by the statistical modeling system is written to the non-transitory computer-readable medium, updating the segmented data being presented to the user based on information in the second dated, stored archive.

16. The non-transitory computer-readable medium according to claim 15, wherein the operations further comprise calculating and storing summary performance data based at least in part on the performance metrics being summarized at a segment level, the summary performance data being stored in a plurality of files with predefined layouts configured to be accessed based on a selection by the user.

17. The non-transitory computer-readable medium according to claim 16, wherein the calculating of the performance metrics comprises calculating the performance metrics using the in-memory processing includes reading all of the historical data, scores, and attributes into the managed portion of the RAM prior to being processed.

18. The non-transitory computer-readable medium according to claim 16, wherein the operations comprise:

interactively detecting an additional selection, by the user, of at least one of a model, a snapshot view, an observation archive, a model segment, or an attribute from among the attributes; and interactively updating the segmented data being presented through the GUI in accordance with the selection.

19. The non-transitory computer-readable medium according to claim 15, wherein the presenting of the segmented data through the GUI comprises making the segmented data accessible by a data visualization system.

20. The non-transitory computer-readable medium according to claim 15, wherein the determining the one or more standardized flags further comprises:

creating standardized industry flags and standardized performance flags using the historical data, scores, and attributes; and calculating the performance metrics based at least in part on the standardized industry flags and the standardized performance flags.

\* \* \* \* \*